Oct. 27, 1970   J. P. BUDLONG ETAL   3,535,919
DYNAMIC DETERMINATION OF PILE LOAD CAPACITY
Filed Dec. 2, 1968   4 Sheets-Sheet 1

INVENTORS.
JOHN P. BUDLONG
KATHLEEN S. BUDLONG
BY Woodling, Krost,
Granger and Rust
ATTORNEYS Oct. 27, 1970 — J. P. BUDLONG ETAL — 3,535,919

DYNAMIC DETERMINATION OF PILE LOAD CAPACITY

Filed Dec. 2, 1968 — 4 Sheets-Sheet 3

INVENTORS
JOHN P. BUDLONG
BY KATHLEEN S. BUDLONG
ATTORNEYS.

United States Patent Office 3,535,919
Patented Oct. 27, 1970

3,535,919
DYNAMIC DETERMINATION OF PILE LOAD CAPACITY
John P. Budlong and Kathleen S. Budlong, both of Anderson Road, Musquodoboit Harbour, Halifax, Nova Scotia, Canada
Filed Dec. 2, 1968, Ser. No. 780,443
Int. Cl. G01n 3/30
U.S. Cl. 73—84  21 Claims

ABSTRACT OF THE DISCLOSURE

Apparatus and the method of dynamically determining the static load bearing capacity of piles is disclosed with a representative electronic circuit being shown utilizing a strain gauge and an accelerometer physically connected to the pile near the top of the pile. The outputs of these instruments are modified and summed to yield a signal proportional to the instantaneous resistance of the soil into which the pile is being driven. The static load bearing capacity of the pile is proportional to the average resistance of the soil over a certain time interval and this is obtained from the instantaneous signal by an averaging circuit which divides the integral of the instantaneous signal over said time interval by the integral of a constant voltage. Control circuits are provided to set the apparatus in operation at any selected time upon the next hammer blow on the pile. The foregoing abstract is merely a resume of one general application, is not a complete discussion of all principles of operation or applications, and is not to be construed as a limitation on the scope of the claimed subject matter.

BACKGROUND OF THE INVENTION

Piles have been driven into the ground for centuries in order to support foundations of buildings, bridge piers and the like, and so considerable rule of thumb or empirical knowledge has been accumulated. If a building requiring huge financial outlay, for example, is being constructed, one does not want the foundation to settle and cause cracking or destruction of the building; hence, extreme care is taken in driving the piles to support the founadtion. Accordingly the piles are driven hard and deeply, and subsequently carefully tested with test loads. This results in a great cost in manpower and equipment time just to make certain that the piles have suffiicent load bearing capacity.

One rule of thumb is that, if upon driving, the pile does not sink noticeably with a given hammer blow, then it is driven deeply enough to have the required load bearing capacity. One may readily appreciate that this is a very crude method which has developed over the centuries, and a more accurate and scientific method of determining the load bearing capacity of the pile is desirable.

In many situations, piling offers both engineering and economic advantages over other types of foundations. In order that these advantages be fully realized, however, it is necessary that the load bearing capacity of the piles be known. Several methods exist for predicting the load bearing capacity of a given pile on the basis of soil types and conditions, but none of these have been found to give consistently accurate results. Errors as large as 500 percent are experienced. Because of this, it has been necessary to use a purely mechanical test to determine the load bearing capacity of a given pile. This type of test involves applying a variable static load to the pile, and obtaining a load-deflection curve, from which the useful load bearing capacity may be determined.

The test has a number of inherent difficulties:
(1) Loading the pile requires either a very large dead weight, or a large jack to apply the load to the pile under test, with adjacent anchor piles to support the jacking reaction. When it is desired to drive and test only one pile in a given area, the necessity for anchor piles is a disadvantage. Further, the pile being tested has both toe bearing and side bearing, whereas the anchor piles have only side bearing. Because of this, it sometimes happens that the anchor piles fail before the test pile, preventing completion of the test.

(2) The test is time-consuming. As a rule, one day is required to set up the test apparatus, one to three days are required to perform the test, and one day is required to remove the test apparatus.

(3) The test is expensive. Setting up and removing the apparatus requires a crew of men, as well as a crane and welders. The actual test involves two or three men for its duration.

(4) The data obtained in the test must be submitted for analysis, the results of which are not immediately available. If further driving and testing are necessary, this may not be known until after the driving and load testing equipment have been moved to another site.

(5) Due to the time and expense of testing a pile, it is not possible to test each pile driven. This leads to a requirement of a safety factor far larger than would be necessary if the load bearing ability of each pile were known.

Accordingly an object of the invention is to provide a more rapid and accurate determination of the load bearing capacity of a pile.

Another object of the invention is to provide a dynamic determination of the static load bearing capacity of the pile while the pile is actually being driven.

Another object of the invention is to provide an electronic circuit connected to instruments physically connected to the pile to readily provide an indication of the static load bearing capacity of the pile.

Another object of the invention is to provide a method and apparatus of rapidly determining, at any desired time during pile driving, when the pile has actually reached a driven depth sufficient to support a desired static load.

SUMMARY OF THE INVENTION

The invention may be incorporated in apparatus for determining the static load bearing capacity of a pile in a pile and driver assembly while the pile is being dynamically driven, comprising in combination, first means connected to the assembly to determine the force on the pile, second means connected to the assembly to determine the acceleration in the pile, means algebraically summing the output signals of said first and second means to develop a signal proportional to the instantaneous resistance of the soil into which the pile is being driven, and output means connected to said summing means to produce an output proportional to the static load bearing capacity of the pile.

Other objects and a fuller understanding of the invention may be had by referring to the following description and claims, taken in conjunction with the accompanying drawing.

DESCRIPTION OF THE PREFERRED EMBODIMENT

Figure 1:
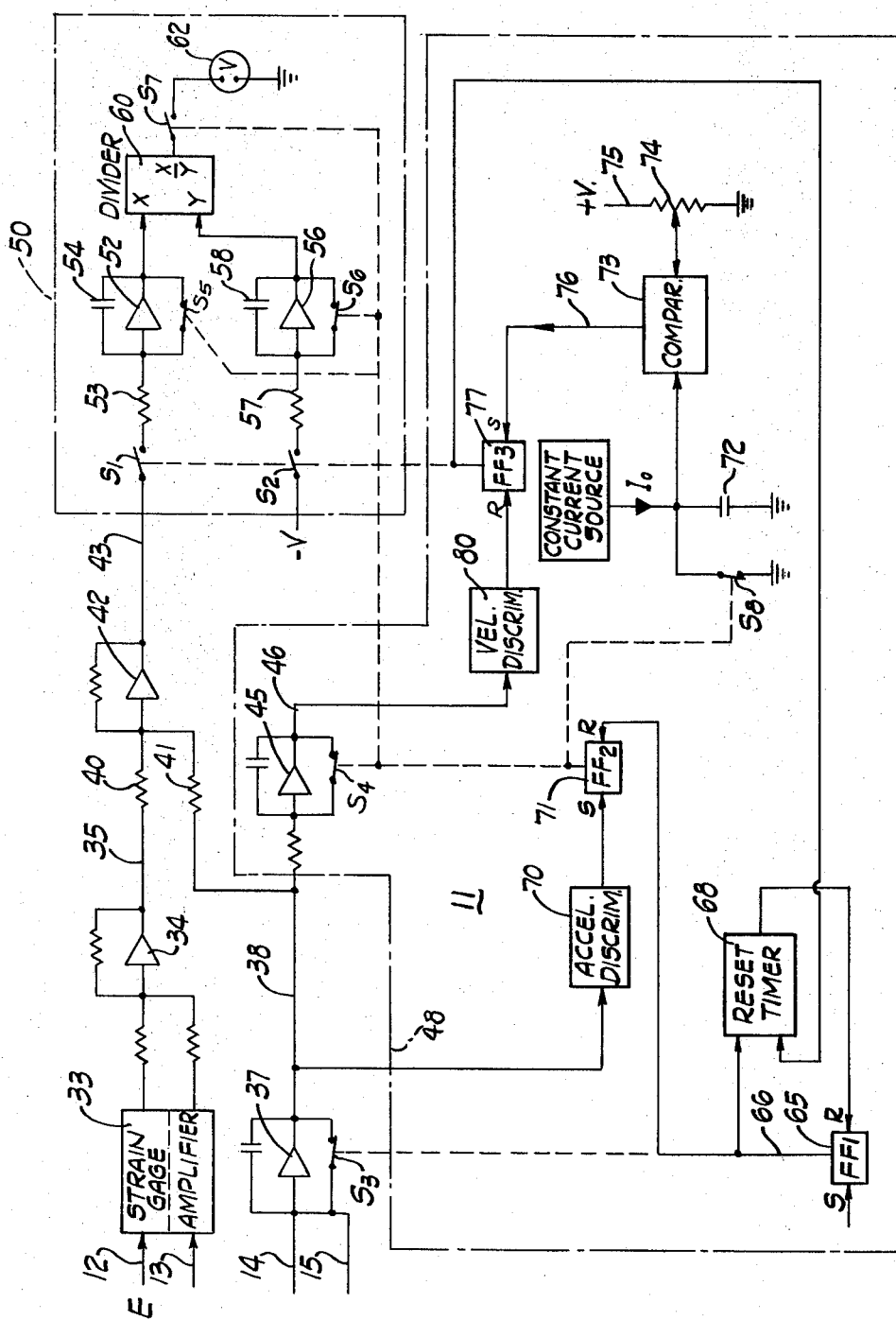
FIG. 1 is a schematic diagram of a circuit for performing the dynamic determination of pile capacity.
Figure 3:
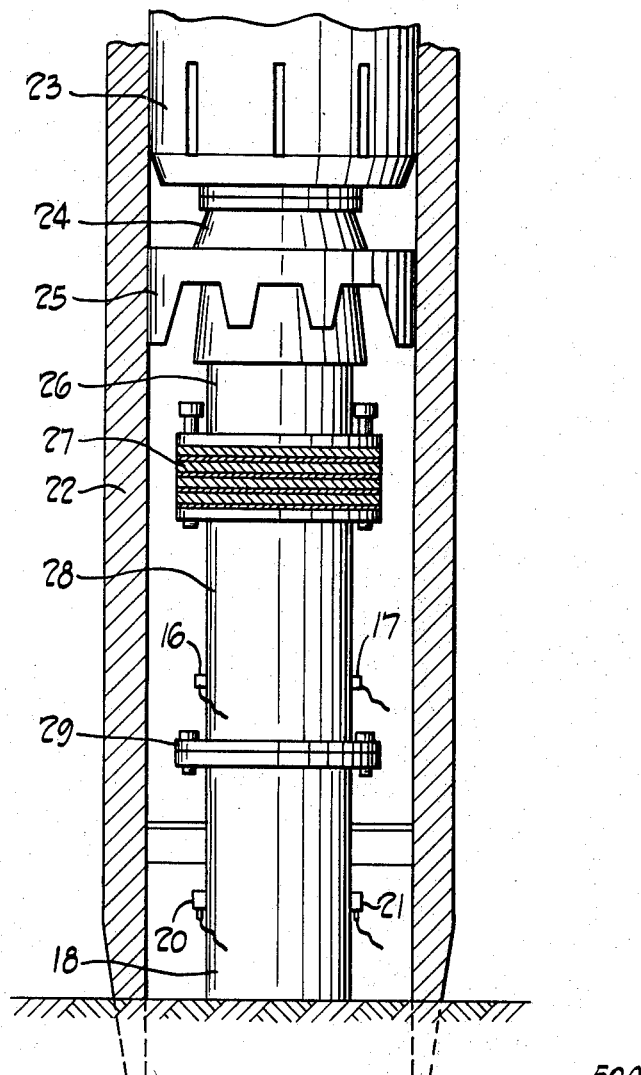
FIG. 3 is a side elevation of a pile driving apparatus incorporating the sensors used with the circuit of FIG. 1.

FIG. 1 shows a preferred embodiment but not the only circuit for accomplishing the desired results of the invention and is not to be taken as limiting the scope of the hereinafter appended claims. In FIG. 1 the circuit 11 is a dynamic response circuit having an input at 12 from a strain gauge and an input at 14 from an accelerometer. FIG. 3 illustrates one method of mounting the strain gauge or any type of force transducer 16 on the side near the top of a pile 18 such as a steel pipe pile. Preferably there are two such strain gauges 16 and 17 mounted on opposite sides of the pile in order to cancel out bending forces on the pile 18 and accordingly there is a second strain gauge input 13 from such second strain gauge 17. The accelerometer input 14 is from an accelerometer 20 such as a commercially available quartz crystal accelerometer. This accelerometer 20 may be mounted directly on the pile 18 near the top and preferably there is a second accelerometer 21 on the diametrically opposite side of the pile in order to cancel out bending forces on the pile 18. Such second accelerometer provides a second accelerometer input 15 as shown in FIG. 1.

FIG. 3 diagrammatically illustrates hammer pile leads 22 to guide a pile driving hammer 23 powered in any conventional manner. The rammer is slidably guided by the leads 22 for striking an anvil 24 which is mounted on a driving cap 25. A cushion adapter 26 and an optional elastic cushion 27 are provided below the driving cap 25 and are connected to the top of the pile 18 by a pipe section 28 and a coupling or top plate 29. The driving cap 25 may have a sufficient amount of elastic cushion within it to protect the accelerometers and strain gauges, and thus cushion 27 may be omitted. Thus as the hammer strikes the anvil the force transducer or strain gauge 16 develops a signal proportional to this hammer force and the accelerometer 20 produces a signal proportional to the acceleration of the top of the pile 18. As the hammer strikes the pile, the force of the hammer is transferred to the pile and the acceleration of the pile is proportional to the deceleration of the hammer. Accordingly in the entire pile and driver or driving hammer assembly it is possible to connect instrumentation to either the pile or hammer to determine the force by either a strain gauge or a force transducer connected to either the pile or the hammer and to measure the acceleration, either negative or positive, by an accelerometer or other instrumentation connected to either the pile or the hammer. Where the instrumentation is stated as being connected to the pile it may be connected, as shown in FIG. 3, to other elements physically connected to the pile, such as the top plate 29, the pipe section 28, the cushion adapter 26 or the driving cap 25 and these are all broadly considered to be a part of the pile.

FIG. 1 illustrates that the two strain gauge inputs 12 and 13 are fed to a two-channel amplifier 33 and the dual output channels are fed to a summing amplifier 34. This may be an operational amplifier connected as a summing circuit and the output 35 thereof produces a signal $e(t)$, see FIG. 2A, proportional to the strain in the pile wall which is proportional to force F. The two accelerometer inputs 14 and 15 are added in a single charge amplifier 37 and produces a signal $a(t)$, see FIG. 2B, on the output 38 thereof which is proportional to the acceleration of the top of the pile.

The signals $e(t)$ and $a(t)$ are passed through resistors 40 and 41 and algebraically added in a summing amplifier 42 to produce a signal on the output 43 proportional to $F - ma = R(t)$ or the instantaneous soil resistance into which the pile is being driven, where $m$ is the mass of the pile. The acceleration signal may be inverted as $-a(t)$, as shown in FIG. 2B, merely for convenience in later algebraically summing which effects a subtraction of the acceleration signal from the force signal. The sum of the two signals now represents $R(t)$, but due to the inverting nature of the operational amplifier of the summing circuit, it occurs as $-R(t)$ and is so shown in FIG. 2D. This signal $-R(t)$ represents the earth's resistance to the penetration of the pile. The contributions of $e(t)$ and $a(t)$ are weighted by resistors 40 and 41 so that $-R(t)$ has a known scale factor. For example, $-R(t)$ might be chosen to be one volt per hundred tons.

The $a(t)$ signal on output channel 38 is also applied to an integrator 45. The output 46 thereof is a velocity signal $v(t)$, see FIG. 2C, which is used in a control circuit 48 described below.

The signal $-R(t)$ on output channel 43 is supplied to an output means or averaging circuit 50. This averaging circuit includes a gate circuit S1. All switches and gates referred to hereinafter may be either electro-mechanical or completely electronic, the choice being dependent on the particular application. The signal $-R(t)$ passing through S1 is applied to an integrator 52 in the averaging circuit 50. The gate S1 is closed only for the time during which averaging is to occur. The integrator 52 operates with a time constant $R_{53}C_{54}$, because the signal is fed through resistor 53 and the capacitor 54 is connected as a feedback on the operational amplifier to make it act as the integrator 52.

A fixed reference voltage $-V$ is passed through a gate circuit S2 and applied to an integrator 56. This integrator has a time constant $R_{57}C_{58}$ which is made equal to $V(R_{53}C_{54})$. This integrator 56 generates a linear ramp or linearly increasing voltage.

A divider 60 has two inputs $x$ and $y$ from the integrators 52 and 56, respectively. The output of $x/y$ is then:

$$\frac{\dfrac{-1}{R_{53}C_{54}}\int_{t_1}^{t_n} -R(t)dt}{\dfrac{-1}{VR_{53}C_{54}}\int_{t_1}^{t_n} -Vdt} = \frac{\int_{t_1}^{t_n} R(t)dt}{t_n - t_1} = R(t) \text{ avg.}$$

The output signal $R(t)$ average is applied to any type of indicating device or meter 62. In one practical circuit made in accordance with the invention, the acceleration discriminator 70 as well as the velocity discriminator 80 were operational amplifiers connected as comparators and a commercially available unit is the Philbrick PF85AU. The divider 60 is commercially available and one such unit is the Transmagnetics 450MP4. The comparator 73 may again be the Philbrick PF85AU unit.

OPERATION

When the pile 18 is struck by the hammer 23, a time-varying force is created in the pile. A typical case is shown in curve 63 in FIG. 2A. The accompanying acceleration signal in the top of the pile 18 is shown in curve 64 in FIG. 2B. The integration of the acceleration signal yields a velocity signal 67, such as shown in FIG. 2C. The major physical effects may be observed in these diagrams as follows: Let the time $t_1$ represent the time required for an elastic compression wave to travel the length of the pile. This is equal to $L/c$ where L is the length of the pile in feet and $c$ is the velocity of sound feet/sec. in the pile 18. From the beginning of the blow until time $t_1$, elastic compression of the pile occurs. During this time, the force and velocity signals are proportional to one another, the relation being $$V = F \times \frac{c}{EA}$$

where F is force in pounds, E is the modulus of elasticity of the pile material, pounds/in.$^2$, A is the pile's cross sectional area, in.$^2$, V is the velocity of the top of the pile, feet/sec. At or near the time $t_1$, the force and velocity signals of FIGS. 2A and 2C diverge, and the velocity signal has reached a maximum and the acceleration signal is approximately zero. This represents the onset of effective earth resistance to the compressed pile as it penetrates the earth. Penetration of the compressed pile, acting more or less as a rigid body, continues from time $t_1$ until the velocity is reduced to zero at $t_0$. For simplicity in the circuit time $t_n$ is used when the velocity becomes slightly negative. This is used for the cut-off time rather than $t_0$ when the velocity becomes zero. It is used for convenience in the circuitry only and $t_0$ could be used at the expense of extra circuitry.

If time $t_0$ is to be used, then a simple magnitude discriminator will not suffice, because the velocity is also zero at the beginning of the hammer blow. The slope must also be taken into account, and this adds to the complexity of the circuit. In the present instrument, use is made of the fact that time $t_n$ is the first time during the blow that the velocity becomes negative, and accordingly can be sensed with a simple discriminator. This takes the form of a differential amplifier 80 whose reference input is connected to a reference voltage, equal to the level on the velocity curve at which reset triggering of flip-flop 77 is to occur. In one practical circuit a voltage of −10 millivolts has been found to work quite well.

The FIG. 2C is a typical velocity curve 67 and as an approximation it may be considered as a straight line between the times $t_1$ and $t_n$. If this were actually a straight line then this would agree with the theoretical analysis of pile driving wherein the pile is a purely rigid body acting under a steady resistance, or deceleration force. Accordingly the present specification makes use of this approximation of the velocity curve as being essentially a straight line in this time interval in order to provide a simplification which has been found to be quite adequate as a means to interpret the dynamic test results.

At the time $t_0$ the pile velocity goes to zero and therefore no velocity dependent effects of earth resistance are found to be present, and hence $R(t)$ at this point is quite representative of the static resistance, which we wish to determine, rather than dynamic effects. Accordingly any time interval between $t_1$ and $t_0$, or little beyond $t_0$, is in principle useful for the averaging of resistance, but the present circuit selects what is considered the best interval of $t_1$ to approximately $t_0$.

These trends covering the time from the beginning of the blow until the time $t_0$ or $t_n$ are the most interesting for the purposes of analysis. This might be in the order of ten milliseconds, for example, on typical piles.

Figure 2:
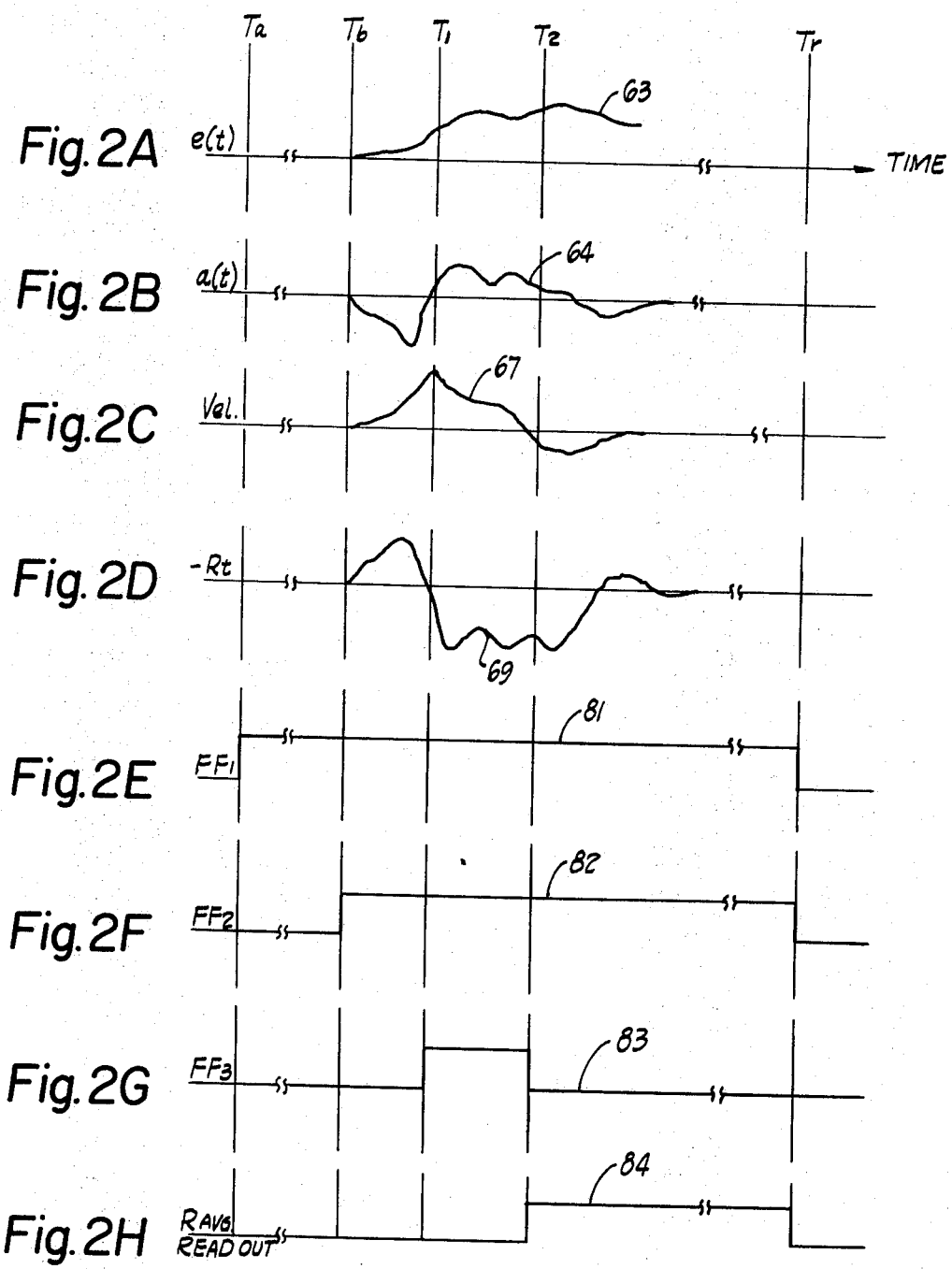
FIGS. 2A–2H show a series of curves plotted against time to illustrate operation of the circuit of FIG. 1.

FIG. 2D shows a curve 69 of the instantaneous resistanme $R(t)$ which is a signal obtainable on the output channel 43. This response curve in actual fact between the time intervals $t_1$ and $t_0$ represents the penetration of the earth by rigid body piles against the soil resistance R, with additional minor variations due to elastic effects. The desired value for the static load bearing capacity of the pile can be calculated by taking the average value of $R(t)$ during the time interval $t_1$ to $t_0$. This is automatically accomplished by the averaging circuit 50 by electronically integrating $R(t)$ from time $t_1$ to $t_0$, and dividing this integral by the elapsed time $t_0-t_1$. Other averaging periods could also be employed, but the above is quite representative. As stated above the time $t_n$ is used rather than $t_0$ and gives very good results in determining the actual average soil resistance. The resulting figure gives the static load bearing capacity and is displayed on the meter 62. It may be displayed in either analog or digital form and a proper choice of the scale factors used in the circuits allows the pile load bearing capacity to be displayed in tons, kips, or any other units desired. The control circuit 48 is used to start the operation of the entire circuit 11 so that one may determine at will the static bearing capacity of a pile during the actual driving of this pile to see if it has reached sufficient load bearing capacity. The signals applied to the circuit 11 must occur in a definite sequence with the timing controlled by the blow of the hammer 23 on the anvil 24. When a static load bearing capacity reading is desired, the circuit 11 is armed at time $t_a$ in FIG. 2 by supplying a signal either manually or electronically to the set input of a multivibrator or flip-flop 65. The output 66 swings to the set state with two results: (1) switch S3 opens, enabling the charge amplifier 37 to operate; and (2) a reset timer 68 is started. If for some reason no hammer blow occurs, the timer resets the flip-flop 65 after a time delay, for example, ten seconds.

Assuming that the blow does occur, then an acceleration signal $a(t)$ on channel 38 is produced. As soon as it departs from zero by some prescribed small amount, this will be time $t_b$ or time of the blow. An acceleration discriminator 70 triggers a second flip-flop 71 into the set state with the following results (1) a switch S4 opens, allowing the integrator 45 to begin operating; (2) a switch S5 and a switch S6 open so that the integrators 52 and 56 may operate when a signal is later supplied to them; (3) a switch S7 closes allowing the readout device 62 to indicate the output of the divider; and (4) a switch S8 opens. When switch S8 opens a constant current $I_0$ begins to flow through a capacitor 72, generating a linear ramp of slope $de/dt=I_0/C_{72}$. This ramp voltage is fed to one input of a comparator 73. The other input of comparator 73 is supplied by a potentiometer 74 in turn fed by a DC voltage source at 75. The potentiometer 74 is preferably calibrated in terms of the length of the pile. The output of the potentiometer will be $$\frac{I_0}{C_{72}} \times \frac{L}{c}$$

When the ramp voltage becomes equal to the potentiometer voltage, the comparator 73 generates a pulse on an output channel 76 which triggers a flip-flop 77 into the set state. In other words the flip-flop 77 is triggered at time $t_1$, which occurs a length of time $L/c$ after time $t_b$. This is the length of time that it takes for an elastic compression wave to travel the length of the pile and is substantially the time when the pile begins to act more or less as a rigid body to penetrate the soil against the soil resistance.

When the flip-flop 77 is triggered at time $t_1$ two things occur: (1) switches S1 and S2 close so that the averaging circuit 50 begins to operate. (2) Reset timer 68 return to zero and begins a new cycle. All circuits are now operating and the average resistance $R_{avg}$ is being computed. When the velocity signal becomes negative by a small amount at time $t_n$ a velocity discriminator 80 generates a pulse which triggers the flip-flop 77 back to the reset state. This opens switches S1 to S2. Integrators 52 and 56 now hold their last output values because the inputs are removed, and the read out device or meter 62 will hold the indication of the value $R_{avg}$. Ten seconds later at time $t_r$, or manually at any time, the reset timer 68 generates a pulse which triggers the flip-flop 65 back into the reset state, with the following results: (1) switch S3 closes; (2) the flip-flop 71 is triggered back to the reset state; (3) switches S4, S5, S6, and 68 all close; and (4) switch S7 opens. All circuits are now returned to their quiescent conditions, and may be rearmed at any time to respond to respond to another blow.

FIG. 2E shows a curve 81 of the voltage on the ouput 66 of the first flip-flop 65 showing that it has a voltage starting at the arming time $t_a$ and ending at reset time $t_r$. FIG. 2F shows a votlage curve 82 on the output of the second flip-flop 71 showing that it has an output signal from the time of blow $t_b$ to the time $t_r$. FIG. 2G shows a voltage curve 83 of the third flip-flop 77 showing that it has an output signal from the time $t_1$ to the time $t_n$. FIG. 2H represents the time during which $R_{avg}$ is available as a DC voltage for readout ($t_n$ to $t_r$). During the time $t_1$ to $t_n$, $R_{avg}$ will take on intermediate values not equal to zero.

It will be noted that the two strain gauges 16 and 17 when summed in the amplifier 34 provide an average strain. Similarly the two accelerometers 20 and 21 when summed in the amplifier 37 provide an output proportional to average acceleration. These are positional averages, that is, the value experienced at the center of the pile in order to cancel out bending moments in the pile.

Conversely the average resistance determined at the meter 62 is a time average, averaging the instantaneous soil resistance $-R(t)$ over the time interval $t_n-t_1$.

DESCRIPTION OF MODIFICATION

Figure 4:
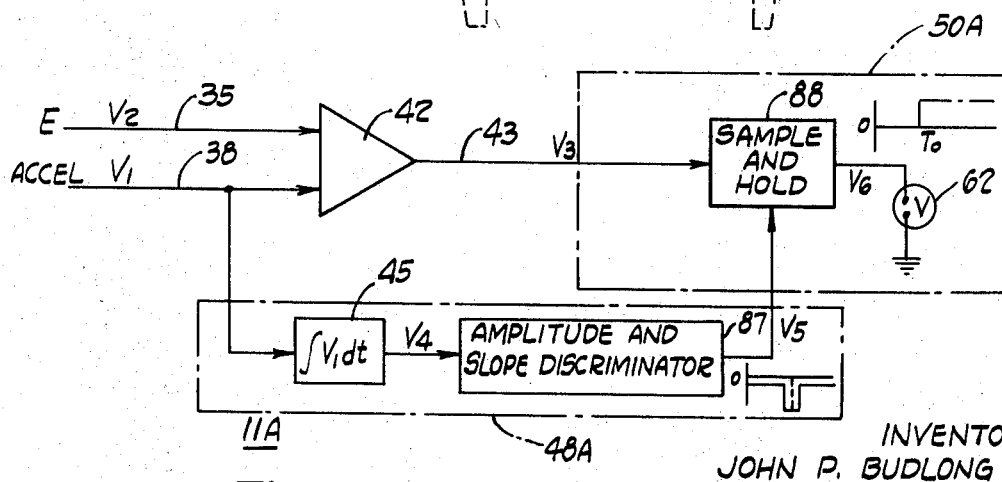
FIG. 4 is a schematic diagram of a modification.

FIG. 4 shows a circuit 11A which obtains the instantaneous soil resistance on the meter 62 or other indicating device. This circuit 11A utilizes the summing amplifier 42 the same as in FIG. 1 and the input signals thereto on channels 35 and 38 are proportional to the strain, or force, and the acceleration, the same as in FIG. 1. This summing amplifier 42 produces an output on channel 43 which is fed to an output means 50A. The circuit 11A is controlled by a control circuit 48A which in general may be similar to the control circuit 48 of FIG. 1. The strain signal may be a voltage $V_2$ and the acceleration signal on channel 38 may be a voltage $V_1$. The control circuit 48A includes an integrator 45 connected to receive the acceleration signal in channel 38. The output of this integrator 45 is a voltage $V_4$ appiled to an amplitude and slope discriminator circuit 87. The output means includes a sample and hold circuit 88. In one practical circuit made incorporating the invention, the integrator 45 may be a commercially available unit such as the Philbrick P2AU. The sample and hold circuit 88 may be the commercially available Burr-Brown 1666/16. The amplitude and slope discriminator 87 utilizes this signal from the integrator 45 and this integrator integrates the acceleration signal to obtain an output proportional to the velocity. The amplitude and slope discriminator senses when this velocity reaches zero with a negative slope at time $t_0$. The condition of negative slope is necessary because the level is also zero prior to the blow.

OPERATION

The voltage $V_1$ is applied to an integrator 45, whose output $V_4$ may be expressed as $V_4=K\int V, dt$. This is a velocity signal with a phase inversion due to the use of an operational amplifier. $V_4$ is applied to an amplitude and slope discriminator 87, whose output $V_5$ is a negative pulse. The leading edge of the pulse occurs when $V_4$ equals $+A$, and the trailing edge occurs when $V_4$ equals $-A$, where A is a small value. The pulse is therefore centered in time around the instant of zero velocity. Hereafter, the pulse will be said to occur at the instant of zero velocity. The acceleration and force signals $V_1$ and $V_2$ are fed into the summing amplifier 42, whose output on channel 43 is expressed as $V_3=-(K_1V_1+K_2V_2)$. $K_1$ is determined by the calibration of the acceleration measuring device and the mass of the pile. For example, $K_1$ might be set so that an acceleration of 2,000 ft./sec.$^2$ on a pile of mass 50 slugs (equal to a force of 100 kips) would result in $K_1V_1=1$ volt. $K_2$ is determined by the calibration on the strain measuring device and the section area of the pile wall. For example, $K_2$ might be set so that a strain of 330 microinches per inch in a steel pile ($E=30+10^6$ p.s.i.) with a wall section of 10 in.$^2$ (equal to a force of 100 kips) would result in $K_2V_2=1$ volt.

$V_3$ and $V_5$ are applied to a sample-and-hold circuit 88, whose output $V_6$ is indicated on a panel meter, oscilloscope, or other indicating and/or recording device 62. When the blow to the pile occurs, $V_6$ remains at zero until the $V_5$ pulse occurs indicating the pile velocity is zero, at which time $V_6$ rises to the instantaneous value of $V_3$ and remains at that value. The value of $V_6$ indicate indicates the utlimte load bearing ability of the pile. With the calibration example given in the previous paragraph, the scale factor would be 1 volt per 100 kips. If a meter is used to indicate the value of $V_6$, its scale may be calibrated in kips, tons, or any other desired units. The calibration alternatively may be arranged to indicate "failure load," defined arbitrarily as some fraction of the ultimate load.

Figure 5:
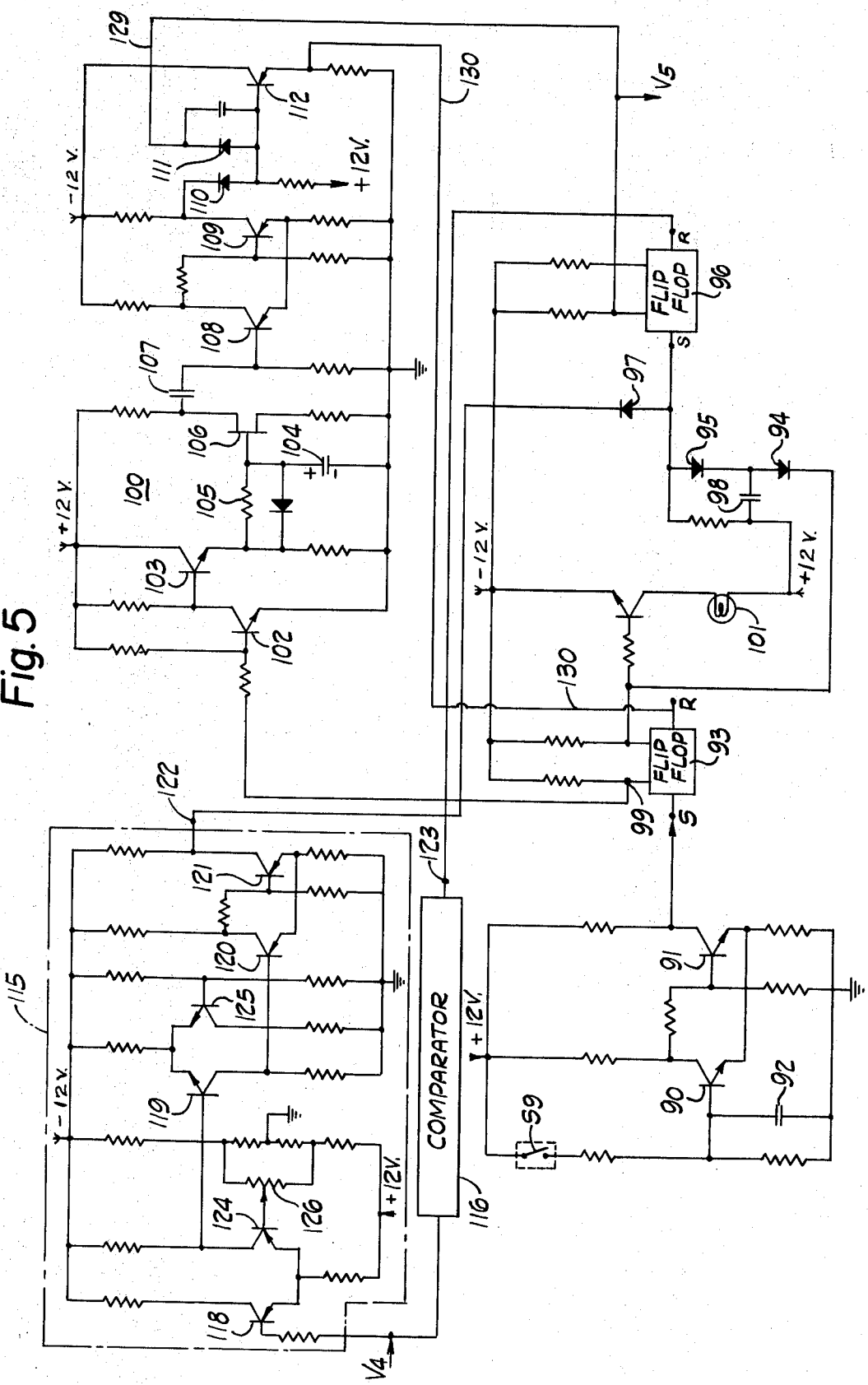
FIG. 5 is a schematic diagram of a part of FIG. 4.

The FIG. 5 shows one circuit that may be used in the amplitude and slope discriminator circuit 87 of FIG. 4. The function of this circuit is to supply a gate pulse to the sample and hold circuit 88. The pulse must occur only if a previous command has been given by the operator. If the command has been given, only pulse must occur, at the instant the velocity signal $V_4$ makes its first zero crossing with negative slope. When a reading of the ultimate load capacity of a pile is desired, the READY button switch S9 is pushed momentarily, less than six seconds before a blow to the pile is to occur. This provides a positive-going signal to the input of the Schmitt trigger circuit including transistors 90, 91. Capacitor 92 acts as a low-pass filter to prevent noise in the switch closing from causing multiple output pulses. The Schmitt output is a positive pulse with fast rise and fall times. The leading edge (positive slope) of this pulse triggers flip-flop 93 from the reset state into the set state. The change of state of flip-flop 93 has three results. First, it back-biases diodes 94 and 95 of the gate at the set input of flop-flop 96, so that the set input may later receive a trigger through a diode 97. The diode 94-capacitor 98-diode 95 is used to slow the rise of the signal from flip-flop 93, so that the change of state of flip-flop 93 does not itself cause the triggering of flip-flop 96. Second, a negative voltage is supplied from terminal 99 to the input of the timer circuit 100. Third, the READY lamp 101 on the panel lights, indicating that the circuits are ready to receive the signals from a blow to the pile.

If the blow does not occur within a time of, for example, six seconds, the timer circuit 100 operates to reset all circuits to the quiescent state, in the following fashion: The negative voltage on terminal 99 turns transistor 102 off, causing its collector and the emitter of transistor 103 to rise to $+12$ volts. Capacitor 104 starts to charge through resistor 105 toward $+12$ volts. When it reaches approximately $+7$ volts, the unijunction transistor 106 fires. A negative-going spike appears on basetwo of the unijunction transistor 106, which is coupled by capacitor 107 to a Schmitt trigger circuit including transistors 108, 109. The Schmitt circuit generates a narrow negative pulse with fast rise and fall times. The trailing edge of this pulse (positive slope) is coupled through the negative logic OR gate diodes 110, 111 and emitter follower transistor 112 to the reset input of flip-flop 93. This pulse resets flip-flop 93 to the rest state and returns all circuits to their quiescent conditions. Assuming that the blow does occur within six seconds, the following sequence of operations occurs to give a readout.

A voltage $V_4$ proportional to the velocity appears at the output of integrator 45. This voltage $V_4$ is connected to the inputs of differential comparators 115 and 116. These comparators 115 and 116 are identical, so only comparator 115 is shown in detail. It should be noted that the values of the input resistor and feedback capacitor of the integrator 45 are not critical, since their value affects mainly the magnitude of the output signal $V_4$. This magnitude is not critical, because only the time of zero crossing is of interest. The major restriction is that the feedback capacitor must be large enough to prevent summing junction current from causing serious drift during the short time the integrator is operating. This time is generally of the order of 10 milli-seconds; with the operational amplifier used in the prototype, a 0.1 microfarad capacitor was amply large. Each of the comparator circuits 115 and 116 consists of two differential amplifiers in cascade, the second of which drives a Schmitt trigger circuit. As the input to transistor 118 goes positive, the collector of transistor 119 goes negative with greater slope. When it reaches about $-1.5$ volts, the Schmitt trigger including transistors 120 and 121 changes state, and the output at terminal 122 or 123 falls from about $-2$ volts to $-12$ volts. As the input swings back in the negative direction, the action reverses. A potentiometer 126 adjusts the reference level at which the transition occurs, and is set in the prototype to $-10$ millivolts for comparator 115 and $-10$ millivolts for comparator 116. When the velocity signal $V_4$ reaches $+10$ millivolts with negative slope, the output of comparator 115 switches from −12 to −2 volts. This signal is applied via terminal 122 to the set input of flip-flop 96, switching it to the set state. A short time later, $V_4$ reaches −10 milli-volts, still with negative slope, and the output of comparator 116 switches from −12 to −2 volts. The signal is applied via terminal 123 to the reset input of flip-flop 96, switching it back to the reset state. The output of flip-flop 96 is then a negative rectangular pulse, whose width is determined by the slope of $V_4$ and the settings of the reference levels of the two comparator circuits 115 and 116. In the prototype, the width is about 0.5 milli-second.

The pulse is applied to the sample and hold circuit 88 via output terminal 128. It is also applied, via conductor 129, to the OR gate diodes 110, 111 and emitter follower transistor 112, and then via conductor 130, to the reset input of flip-flop 93. The leading edge (negative slope) of the pulse turns the sample and hold circuit 88 on. The trailing edge (positive slope) turns the sample and hold circuit 88 off again, and also switches flip-flop 93 back to the reset state. All circuits are then returned to their quiescent conditions, and the output voltage $V_6$ indicates the ultimate load bearing capacity of the pile. When $V_6$ has been read and/or recorded, it is reset to zero, for example, by a time delay circuit which resets $V_6$ after a predetermined time interval.

As shown in FIG. 1 the two accelerometers 20 and 21 are used to compensate for bending of the pile and to obtain a positional average of the acceleration. The conventional method for averaging the two signals 14 and 15 would be to use two amplifiers and a summing circuit, generally as shown for obtaining a summation of the strain or force signal 35. However an understanding of the nature of quartz crystal accelerometers allows a simpler approach. The output of a quartz accelerometer is an electrical charge Q proportional to acceleration and occurs as a current $i(t)$. To obtain a voltage proportional to acceleration it is necessary to integrate the current; $\int i(t)\ dt = Q = K_1$ Accel. In the case of two quartz accelerometers, a voltage proportional to the acceleration may be obtained by integrating the algebraic sum of the two signals wtih a single operational amplifier. The operational amplifier 37 is fed the inputs of the two different current signals and the integrated output is a voltage $e(t) = K_2$ accel.$_{avg}$. Thus the single charge amplifier 37 really is an integrator because of the capacitance feedback and yet it achieves an output proportional to the average acceleration by using a single operational amplifier rather than by using two extra amplifiers and results in considerable savings in cost, space, and complexity.

The above description of the operation refers to a summation in the amplifier 42 of the signals proportional to the average force and the average acceleration. In order to conform to the general formula of $R = F - ma$, this summation is an algebraic summation to subtract the signal proportional to the acceleration from the signal proportional to the force. Instrumentation is easier to provide which performs the operation of $R = F + (-ma)$. The inverted acceleration signal is obtained or may be obtained simply by mounting the accelerometer upside down on the pile. The sum of the two signals now represents $R(t)$, but due to the inverting nature of the operational amplifier 42, it occurs as $-R(t)$, and is so designated. This negative sign at this point is inconsequential because it is again inverted in the averaging circuit 50, providing an output indication at the meter 62 which is $+R(t)_{avg}$.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed. For example, the above-given interpretation and processing of the signals could also be done by digital techniques.

What is claimed is:

1. Apparatus for determining the static load bearing capacity of a pile in a pile and driver assembly while the pile is being dynamically driven, comprising in combination,
   first means connected to the assembly to determine the force on the pile,
   second means connected to the assembly to determine the acceleration in the pile,
   means algebraically summing the output signals of said first and second means with said output signals being of substantially opposite sign to develop a signal proportional to the instantaneous resistance of the soil into which the pile is being driven,
   and output means connected to said summing means to produce an output proportional to the static load bearing capacity of the pile.

2. Apparatus as set forth in claim 1, wherein said first means determines the average force on the pile.

3. Apparatus as set forth in claim 1, wherein said second means determines the average acceleration in the pile.

4. Apparatus as set forth in claim 1, wherein said first means includes a strain gauge connected to the pile to determine the strain in the pile as it is being driven.

5. Apparatus as set forth in claim 1, wherein said second means includes an accelerometer connected near the top of the pile.

6. Apparatus as set forth in claim 1, wherein said means algebraically summing subtracts a signal proportional to the acceleration from a signal proportional to the strain in the pile.

7. Apparatus as set forth in claim 1, including first and second accelerometers in said second means,
   and said second means including means to determine the average acceleration sensed by said first and second accelerometers.

8. Apparatus as set forth in claim 7, wherein said first and second accelerometers have an output which is an electrical charge Q proportional to the acceleration therein and the output of each accelerometer is a current $i$ and a single integrator to integrate the outputs of said two accelerometers to obtain a voltage output proportional to the average acceleration sensed by the two accelerometers.

9. An apparatus as set forth in claim 1, including digital control circuit means to control the starting and stopping by arming the apparatus prior to the time of the blow on the top of the pile and terminating upon expiration of a time delay period after the velocity of the pile reaches zero.

10. Apparatus as set forth in claim 1, wherein said output means includes a constant voltage source,
    means to integrate the output from said constant voltage source to establish a linearly increasing voltage,
    and dividing means to divide a signal proportional to the instantaneous resistance signal by the linearly increasing voltage.

11. Apparatus as set forth in claim 10, including an integrator to integrate the output signal from said summing means to establish the signal proportional to the instantaneous resistance of the soil.

12. Apparatus as set forth in claim 1, wherein said output means includes averaging means to average said instantaneous resistance signal over a period of time with the output of said averaging means being proportional to the static load bearing capacity of the pile.

13. Apparatus for determining the static load capacity of a pile while being dynamically driven comprising, in combination,
    a strain gauge,
    means fastening said strain gauge to the top of a pile being driven, an accelerometer, means fastening said accelerometer to the top of a pile being driven.

means modifying and algebraically summing the output of said accelerometer and said strain gauge to develop a signal proportional to the resistance of the soil into which the pile is being driven, first means to integrate the output signal from said summing means, a constant voltage source, second means to integrate the output from said constant voltage source to establish a linearly increasing voltage, dividing means to divide the output from said first integrator by the linearly increasing voltage, means to start the operation of said integrating and dividing means approximately at the time when the velocity of the top of the pile reaches maximum, and means to stop the operation of the integrating and dividing means approximately at the time when the velocity of the top of said pile reaches zero, whereby an average resistance of the soil into which the pile is being driven is obtained on the output of said divider which is proportional to the static load bearing capacity of the pile.

14. In a pile and driver assembly, the method of using a force transducer and accelerometer in determining the static load bearing capacity of the pile while it is being dynamically driven, comprising the steps of, connecting the force transducer to the assembly to develop a signal proportional to the force on the pile, connecting the accelerometer to the assembly to produce a signal proportional to the acceleration in the pile, algebraically summing the signals of the force transducer and accelerometer to develop a signal proportional to the instantaneous soil resistance of the soil into which the pile is being driven, determining the approximate time when the velocity of the pile is zero, and obtaining an output reading from said summation in accordance with the time when said pile velocity is approximately zero.

15. The method of claim 14, including the use of a second accelerometer, said method including deriving from the first and second accelerometers an output which is an electrical charge Q proportional to acceleration therein and the output of each accelerometer is a current $i$, and integrating jointly the two outputs of the accelerometers to obtain a voltage output proportional to the average acceleration sensed by the two accelerometers.

16. The method as set forth in claim 14, wherein said algebraic summing step subtracts the signal of the accelerometer from the signal of the force transducer.

17. The method as set forth in claim 14, wherein the step of developing a signal proportional to the force is a signal proportional to the average force in the pile.

18. The method as set forth in claim 14, wherein the step of developing a signal proportional to the acceleration is a signal proportional to the average acceleration in the pile.

19. The method as set forth in claim 14, wherein said determining step includes integrating the acceleration signal to obtain a signal proportional to the velocity in the pile, and sensing the velocity signal to discriminate at about the time when the polarity of such velocity signal changes between positive and negative, 20. The method as set forth in claim 14, wherein a constant voltage source is used, including the steps of integrating the output from said constant voltage source to establish a linearly increasing voltage, integrating the signal proportional to the instantaneous soil resistance, and dividing the output of the second integration by the output of the first integration to obtain a signal proportional to the average resistance of the soil into which the pile is being driven.

21. The method as set forth in claim 14, including digitally controlling the starting and stopping of the determining method commencing approximately at the time when the velocity of the pile reaches maximum and terminating approximately at the time when the velocity of the pile reaches zero.

References Cited

UNITED STATES PATENTS

| | | | |
|---|---|---|---|
| 2,580,299 | 12/1951 | Hunicke | 73—84 |
| 3,375,712 | 4/1968 | Postma | 73—117.4 |

JERRY W. MYRACLE, Primary Examiner

U.S. Cl. X.R.

73—509